United States Patent [19]

Park et al.

[11] Patent Number: 4,880,689

[45] Date of Patent: Nov. 14, 1989

[54] DAMAGE RESISTANT DECORATIVE LAMINATE

[75] Inventors: John J. Park; Paul W. White, both of Loveland; Calvin Richardson, Cincinnati, all of Ohio

[73] Assignee: Formica Corporation, Wayne, N.J.

[21] Appl. No.: 788,772

[22] Filed: Oct. 18, 1985

[51] Int. Cl.[4] .............................................. D06N 7/04
[52] U.S. Cl. ................................. 428/143; 428/144; 428/147; 428/148; 428/150; 428/164; 428/165; 428/206; 428/208; 428/323; 428/329; 428/530; 428/908.8; 428/212; 428/328; 428/331; 428/341; 428/404; 428/514; 156/278; 156/279
[58] Field of Search .............. 428/150, 164, 165, 197, 428/206, 208, 329, 530, 908.8, 341, 143, 144, 147, 148, 328, 212, 331, 404, 514

[56] References Cited

U.S. PATENT DOCUMENTS

| Re. 32,152 | 5/1986 | Scher et al. | 428/148 |
|---|---|---|---|
| 3,975,572 | 8/1976 | Power | 428/452 |
| 4,251,576 | 2/1981 | Osborn et al. | 428/331 |
| 4,255,480 | 3/1981 | Scher et al. | 428/208 |
| 4,256,794 | 3/1981 | Meisel | 428/195 |
| 4,258,103 | 3/1981 | Hosmer et al. | 428/342 |
| 4,263,081 | 4/1981 | Scher et al. | 156/279 |
| 4,278,483 | 7/1981 | Mansolillo | 156/79 |
| 4,305,987 | 12/1981 | Scher et al. | 428/148 |
| 4,322,468 | 3/1982 | Raghava | 428/204 |
| 4,327,141 | 4/1982 | Scher et al. | 428/148 |
| 4,374,886 | 2/1983 | Raghava | 428/172 |
| 4,395,452 | 7/1983 | Scher et al. | 428/148 |
| 4,400,423 | 8/1983 | Scher et al. | 428/204 |
| 4,409,280 | 10/1983 | Wiley et al. | 428/203 |
| 4,424,261 | 1/1984 | Keeling et al. | 428/530 |
| 4,430,375 | 2/1984 | Scher et al. | 428/148 |
| 4,486,466 | 12/1984 | Leech et al. | 427/96 |
| 4,499,137 | 2/1985 | O'Dell et al. | 428/211 |
| 4,504,607 | 3/1985 | Leech | 523/427 |
| 4,505,768 | 3/1985 | Cooley | 156/153 |
| 4,505,974 | 3/1985 | Hosler | 428/329 |
| 4,517,235 | 5/1985 | Ungar et al. | 428/148 |
| 4,532,170 | 7/1985 | O'Dell et al. | 428/143 |
| 4,543,290 | 9/1985 | Brooker et al. | 428/336 |

*Primary Examiner*—Ellis P. Robinson
*Assistant Examiner*—P. J. Ryan
*Attorney, Agent, or Firm*—Frost & Jacobs

[57] ABSTRACT

Decorative laminate having improved resistance against marring, abrasion, staining and crocking, and method for the preparation thereof, the laminate comprising a substrate and a decorative sheet, the decorative sheet having on the exposed surface a layer consisting essentially of a thermoset resin, substantially fully hydrolyzed polyvinyl alcohol, fumed amorphous silica, and particulate abrasive material having a hardness higher than that of silica. Abrasion resistance greater than 3000 cycles (NEMA Wear) by the NEMA test LD 3-3.01 is obtained in combination with improved mar resistance.

23 Claims, No Drawings

DAMAGE RESISTANT DECORATIVE LAMINATE

BACKGROUND OF THE INVENTION

The present invention relates to high pressure damage resistant decorative laminates having improved resistance to marring, abrasion, staining, dusting and crocking (as hereinafter defined), and to a method for the preparation thereof. Although not so limited, the invention is particularly applicable to laminates with textured surfaces formed either by a texture film interposed between the surface layer of the laminate and steel plates between which the laminates are subjected to heat and pressure, or from a textured steel plate. The combination of improved properties in the decorative laminate of the invention makes possible the omission of the conventional transparent surface layer, or overlay, normally required to protect the printed or pigmented decorative sheet in prior art laminates.

The novel combination of properties in the decorative laminate of this invention is achieved by coating the decorative sheet with a mixture consisting essentially of a thermoset resin, substantially fully hydrolyzed polyvinyl alcohol, fumed amorphous silica, and particulate abrasive material having a hardness higher than that of silica.

The prior art is replete with proposals for abrasion resistant decorative laminates containing finely divided mineral or abrasive materials adjacent the outermost or exposed surface thereof. To the best of applicant's knowledge, none of these prior art laminates combines improved abrasion resistance with resistance against marring, staining and crocking.

U.S. Pat. No. 4,322,468, assigned to the assignee of the present application, discloses a laminate consisting essentially of a core layer, a print layer coated with a melamine formaldehyde thermoset resin and containing finely divided abrasive materials, and a surface coating of a hydrolyzed polyvinyl alcohol-modified melamine formaldehyde having a surface coating weight of from about 40 to 140 grams per square meter, with the amount of hydrolyzed polyvinyl alcohol in the coating being from about 5 to 30% by weight of the melamine formaldehyde reaction product solids. While alleged to have improved abrasion resistance, the laminate of this patent exhibits no more than 600 cycles abrasion wear resistance by the standard NEMA test LD 3-3.01, described hereinafter.

U.S. Pat. No. 4,311,748 discloses a laminate very similar to that of U.S. Pat. No. 4,322,468, except for omission of finely divided abrasive materials.

U.S. Pat. Nos. 4,255,480; 4,263,081; 4,305,987; 4,327,141; 4,395,452; 4,400,423; 4,430,375 and 4,517,235, all assigned to Nevamar Corporation, disclose laminates and methods for the preparation thereof alleging abrasion resistant properties resulting from a thin layer (up to 0.3 mil thickness) of finely divided mineral material of 20 to 50 micron particle size and a binder. The mineral material may be silica and/or alumina, and the binder is preferably microcrystalline cellulose, with less preferred binders including anionic acrylic polymer, carboxy methylcellulose and the like. A silane may also be added as a coupling agent. The mineral particles and binder material are incorporated with a melamine formaldehyde resin or polyester resin. Typically the coating comprises about 5 to 10 parts by weight of microcrystalline cellulose for about 20 to 120 parts by weight of the mineral material. When present, a silane comprises about 0.5% to 2.0% by weight based on the weight of the mineral.

U.S. Pat. Nos. 4,499,137 and 4,532,170 disclose a laminate and a facing sheet therefor having stain and scuff resistant properties, the outer surface thereof having a thin facing layer of solid lubricant, such as a polyethylene wax, a binder and a thermosetting resin. The lubricant preferably has a particle size ranging from 1 to 25 microns and a melting point of 220° to 230° F. An oxidized wax or silicone resin cannot be used as a solid lubricant. The thermosetting resin may be a polyester resin or melamine formaldehyde resin. The binder is microcrystalline cellulose.

U.S. Pat. No. 4,505,974 discloses a mar-resistant decorative laminate and a method for the production thereof having a thermoset resin impregnated decorative sheet, the outermost surface thereof containing mineral particles ranging from about 5 to about 100 millimicrons in an amount ranging from about 0.5 to about 25 grams per square meter of surface area. The mineral particles are positioned within about the outermost 25 microns of the laminate. The method involves forming a thermosetting resin impregnated component sheet containing mineral particles having the size range indicated above, positioning the component sheet with its particle surface upward as the uppermost component of a decorative laminate assembly, and heat and pressure consolidating the assembly. While the laminate of this patent achieves good mar resistance, the abrasion resistance thereof is only marginally superior to that of a laminate containing no mineral particles in its outermost layer. The mineral particles are silica, alumina, titanium oxide, tin oxide, zirconium oxide, and the like.

Earlier patents disclosing the incorporation of mineral or abrasive particles in a melamine formaldehyde resin or modified melamine formaldehyde resin include U.S. Pat. Nos. 3,135,643; 3,445,327; 3,525,664; 3,798,117 and 3,975,572. None of these patents discloses laminates achieving abrasion resistance which would be considered adequate by present standards.

Despite the extensive work done in this field there is not now available a decorative laminate capable of exhibiting abrasion resistance greater than 3000 cycles ("NEMA Wear") by the NEMA test LD 3-3.01, together with superior resistance against marring, staining and crocking. A genuine need exists for such a product, particularly one having a "suede" or matte finish and a solid dark color, as well as a simplified method for production thereof using conventional equipment.

SUMMARY OF THE INVENTION

It is a principal object of the invention to provide a decorative laminate and a method for the preparation thereof which provides the above combination of improved properties.

It is a significant advantage of the invention that high abrasion resistance is achieved at a relatively low level of particulate abrasive material since this reduces wear on cutting tools, and does not adversely affect the appearance of the decorative sheet. Moreover, a texture imparting film can be used in the production of laminates of the invention, which was not possible previously when abrasive particles were incorporated in the surface layer because of protrudance of the sharp abrasive particles when pressed against the texture imparting film or paper.

In accordance with the invention there is provided a decorative laminate having improved resistance against marring, abrasion, staining, dusting and crocking, said laminate comprising a substrate and a decorative sheet in superposed relation, said decorative sheet having at least on the exposed surface thereof a layer consisting essentially of a thermoset resin, substantially fully hydrolyzed polyvinyl alcohol, fumed amorphous silica, and particulate abrasive material having a hardness higher than that of silica, the proportions of said thermoset resin, polyvinyl alcohol, fumed amorphous silica and particulate abrasive being such that said exposed surface exhibits mar resistance of less than 4% gloss change by the herein described test, and abrasion resistance greater than 3,000 cycles (NEMA Wear) by the NEMA test LD 3-3.01.

In its broadest aspect the method of the invention comprises forming a component sheet having on the surface thereof a composition consisting essentially of a thermosetting resin, substantially fully hydrolyzed polyvinyl alcohol, fumed amorphous silica, and particulate abrasive material having a hardness higher than that of silica; assembling said coated component sheet with a substrate; and subjecting the assembled component sheet and substrate to heat and pressure sufficient to consolidate said component sheet and substrate, to cure said resin to a thermoset condition and to form an exposed surface exhibiting mar resistance of less than 4% gloss change by the herein described test, and abrasion resistance greater than 3000 cycles (NEMA Wear) by the NEMA test LD 3-3.01.

In a preferred embodiment the method comprises the steps of incorporating in an aqueous dispersion a thermosetting resin in an amount such that the solid components of the resin range from about 40% to 60% of the weight of the liquid resin, substantially fully hydrolyzed polyvinyl alcohol in an amount ranging from about 1.5% to 3.5% by weight, fumed amorphous silica in an amount ranging from about 2% to 3% by weight, and particulate abrasive material in an amount ranging from about 1.5% to 3.5% by weight; coating a component sheet with said dispersion in an amount such that the solid components of the dispersion are from 38% to 65% by weight of the final dried component sheet; assembling said coated component sheet with a substrate; and subjecting the assembled component sheet and substrate to heat and pressure sufficient to consolidate said component sheet and said substrate, to cure said resin to a thermoset condition, and to form an exposed surface exhibiting improved mar resistance, abrasion resistance, stain resistance, dusting resistance and crocking resistance.

DETAILED DESCRIPTION OF THE INVENTION

As used herein the term mar resistance means the ability to withstand sliding contact between laminate surface and other materials, particularly the back of other laminates during storage, transit and application.

The test used herein measures gloss at 2 locations. This is done by rubbing for 10 double strokes on a crockmeter apparatus using 3 M Scotch Brite type 8A pad at each location, measuring the gloss at each location, determining the change in gloss at each location and dividing by the original gloss. The average of the two results is multiplied by 100 to arrive at gloss loss as a percentage.

Acceptable values by this test are between −8 and +8%. Conventional laminates are typically within the range of 20 to 30 percent.

Abrasion resistance is defined as the ability to resist sliding wear in service. This property is determined by the standard NEMA test method LD 3-3.01. In this test a Taber abrader is used in which a laminate sample is clamped on a rotating disk over which two weighted rubber wheels ride, faced with calibrated alumina sandpaper strips. As the laminate surface is rotated under the wheels, the abrasive action of the sandpaper cuts through the surface of the laminate and gradually through the overlay until the printed pattern or solid color layer is exposed and destroyed.

The "initial point" is designated as that at which the color or pattern is worn through in each of four quadrants. The "final point" is defined as that at which the color or pattern is completely worn away. The "NEMA Wear" is the average of initial point and final point values.

The specified value for general purpose laminate of 0.050 inch thickness (grade GP 50) is 400 cycles minimum (NEMA Wear).

The specified value for high-wear laminate 0.062 inch thick (grade HW 62) is 3000 cycles minimum (NEMA Wear).

Conventional laminates with a solid color decorative sheet typically exhibit wear resistance of about 700 cycles, with an initial point of 500 cycles.

Stain resistance is defined as the ability to remove stains without permanent visual damage to the laminate surface. This property is determined by NEMA test method LD 3-3.09. This rates a laminate surface on the ease of removal of 23 mild staining agents and 6 more severe staining agents. Specified values for general purpose and high-wear laminates are no effect for reagents 1 through 23 and moderate effect for reagents 24 through 29.

Crocking resistance is used herein to mean the ability to clean laminate surfaces with a mild abrasive without removing the color pigmentation. This test is conducted by an AATCC Test Method 8 using a crockmeter apparatus. In this test a laminate sample is placed flat on the test apparatus, a mild abrasive is applied to the surface, a 2 inch by 2 inch white cloth square is fixed to a finger, the crockmeter is operated for 10 rotations, after which the square cloth is removed and the coloration is assessed in accordance with specified ratings 1 through 5.

Acceptable values are 4 and 5. Conventional dark, solid color laminates exhibit values 2 and 3.

Laminates of the present invention exhibit mar resistance of less than 4% gloss change, abrasion resistance greater than 3000 cycles (NEMA Wear), stain resistance of no effect for all reagents, and crocking resistance of 4 to 5.

A further test used for comparison in the Tables below is referred to as "Dust Rating". The test for this uses an abrasion/cleanability tester to slide a cured phenolic resin surface (e.g. the back of a laminate) over the specimen surface. The sliding can result in abrasion of the phenolic surface by the specimen surface. The resulting dust is removable but is nevertheless a valid defect. The dust rating is a measure of the reduction in gloss caused by the surface dust. Low values (not greater than 20) indicate good resistance to dusting.

As will be shown by test data set forth below, the presence of substantially fully hydrolyzed polyvinyl alcohol, fumed amorphous silica and particulate abrasive material in a thermoset resin is critical in achieving the greatly enhanced properties indicated above. Omission of any one of the ingredients results in loss of one or more of the desired properties.

Although not intending to be bound by theory, it is believed that the polyvinyl alcohol acts as a coupling agent between the fumed amorphous silica and the particulate abrasive material and that the fumed amorphous silica acts as an agglomerating agent, thereby causing the particulate abrasive material to be concentrated at the surface where it is most useful. The modified resin provides a strong and tough encapsulating film which securely anchors the adhesive particles and masks sharp exposed edges and corners which would otherwise make the laminate surface abrasive.

For the above reason the use of a texture imparting paper or film interposed between the top surface of the laminate and the steel press is possible since the protrudance of sharp cornered abrasive particles is avoided. It is known that textured papers or films produce a laminate with a smoother microsurface than textured metal plates. This difference affects the ability of the laminate to resist staining.

The incorporation of substantially fully hydrolyzed polyvinyl alcohol is believed to be the reason for the marked improvement in crocking resistance in the laminate of the invention.

The present invention succeeds in obtaining outstanding abrasion resistance with a relatively small amount of relatively small abrasive particles without adverse effect on mar resistance.

The solid components of the thermosetting resin content range from about 38% to 65% by weight based on the final dry weight of the decorative sheet, the weight of the decorative sheet ranging from about 55 to 200 grams per square meter, as is conventional. The preferred solid component resin content ranges from about 45% to 58% of the final weight of the decorative sheet. The preferred resin is melamine formaldehyde having a formaldehyde to melamine molar ratio between 1.0 and 3.0, preferably between 1.15 and 2.40. A dispersion having a solids content of about 40% to 60% by weight has been found to give good results.

A modified melamine formaldehyde resin or a polyester thermosetting resin can also be used in the practice of the invention. A typical modified melamine formaldehyde resin has the following formulation: formaldehyde as an aqueous solution and melamine crystal in a molar ratio of about 2:1; plasticizer such as toluene sulfonamide, ethylene glycol, diethylene glycol, polyethylene glycol, urea, 2-phenoxyethanol; buffers such as sodium hydroxide, diethanolamine, triethanolamine, ammonia; and solvents such as water, isopropanol, ethanol.

Hydrolyzed polyvinyl alcohol is present in an amount sufficient to provide from 0.2 to 10 grams per square meter of surface area and preferably from 3 to 5 grams per square meter of surface area. The polyvinyl alcohol should be hydrolyzed to the extent of about 87% to 99.6% of the acetate groups on a dry basis, and the term "substantially fully hydrolyzed" used herein is to be understood as falling within this broad range. Preferably the degree of hydrolysis ranges between about 98% and 98.5%. As explained in the above-mentioned U.S. Pat. No. 4,322,468 fully hydrolyzed polyvinyl alcohol, which is available commercially, is the product of a fully hydrolyzed polyvinyl ester, such as polyvinyl acetate or polyvinyl formate. The fully hydrolyzed material is preferred since it has a longer shelf life than partially hydrolyzed polyvinyl alcohol.

Fumed amorphous silica is present in an amount sufficient to provide from 0.2 to 10 grams per square meter of surface area, and preferably from about 4 to 6 grams per square meter of surface area. It is preferred to use a fumed silica produced by the flame-hydrolysis process, wherein silicon tetrachloride is reacted with hydrogen and oxygen in a flame. The particle size of such material ranges broadly from about 0.007 to 0.05 microns. Grades sold under the registered trademark Cab-O-Sil by The Cabot Corporation, ranging from about 0.01 to about 0.025 microns in particle size have been found to be satisfactory in the present invention. Fumed amorphous silica sold under the registered trademark Aerosil by Degussa Corporation can also be used.

The principal uses of fumed amorphous silica in liquid systems are for the control and increase of viscosity and thixotropy. As pointed out above, in the present invention the fumed amorphous silica is believed to act as an agglomerating agent which, in combination with the hydrolyzed polyvinyl alcohol, causes the particulate abrasive to be concentrated at the surface of the decorative sheet of the laminate.

The particulate abrasive material is present in an amount sufficient to provide from 0.2 to 10 grams per square meter of surface area and preferably from about 4 to 6 grams per square meter of surface area. Less than 0.2 gram per square meter has little effect on properties, while greater than 10 grams per square meter may result in a cloudy surface appearance. It is a significant feature of the invention that an abrasive material having a hardness higher than that of silica be used, for optimum abrasion and mar resistance. Abrasive materials which may be used include alumina, titanium oxide, tin oxide, zirconium oxide, diamond, alumina coated on silica, and zirconia coated on silica. Such particulate materials generally have a Mohs hardness of at least about 9, whereas the Mohs hardness of silica ranges between 6 and 8.

The mean particle size of the particulate abrasive is of importance and ranges broadly between about 5 and 30 microns. A mean particle size between about 15 and 25 microns is preferred As indicated above, the amount of particulate abrasive material in the laminate of the present invention results in an improved combination of properties in comparison to those disclosed in the prior art.

The use of a particulate abrasive having a refractive index closely approximating that of the cured resin coating is desirable in order to retain the clarity and visual appearance of the surface of the decorative sheet. Thus, when using a melamine formaldehyde resin, calcined alumina is the preferred abrasive since its refractive index is close to that of the cured resin, and it possesses a high degree of clarity.

In the preferred practice of the invention a nonionic surfactant is used in the dispersion of thermosetting resin, hydrolyzed polyvinyl alcohol, fumed amorphous silica and particulate abrasive material. A cationic surfactant may also be used. When used, the surfactant is present in an amount sufficient to provide from about 0.01 to 0.20 gram per square meter of surface area, and preferably from about 0.02 to 0.10 gram per square meter of surface area. Preferred surfactants include an ethylene oxide adduct modified by terminating the polyoxyethylene chain with a hydrophobic group, and an alkoxypolyalkoxyethanol.

An exemplary dispersion which provides the desired amounts of each component per unit of area, when applied within the range of about 100 to about 450 parts by weight of dispersion per 100 parts by weight of untreated decorative paper, has the following composition in weight percent:

| | |
|---|---|
| resin solid components | 40–60% |
| hydrolyzed polyvinyl alcohol | 1.5–5.0% |
| fumed amorphous silica | 2–4% |
| particulate abrasive | 1.5–6.0% |
| surfactant | 0.01–0.10% |
| water and organic solvents | balance |

It is within the scope of the invention to use any one or more of the preferred ranges indicated above with any one or more of the broad ranges for the remaining components set forth above.

In the method of preparation of laminates of the invention, the particulate abrasive material may be incorporated into the decorative sheet in various ways. The abrasive material may be added to the thermosetting resin either before o after admixture thereof with hydrolyzed polyvinyl alcohol, and fumed amorphous silica, and the dispersion may be applied to the decorative sheet, which is preferably an opaque alpha cellulose paper. Application can be in any conventional manner as by dipping, spraying, knife coater or roll coater. If applied by dipping the sheet will have abrasive on both surfaces. In this embodiment final wear will be increased due to the presence of abrasive on the inner surface of decorative sheet. Alternatively, a decorative sheet which has particulate abrasive material already incorporated therein on one surface as part of the composition of the sheet may be coated with a dispersion of the thermosetting resin, hydrolyzed polyvinyl alcohol and fumed amorphous silica to form the final composition of the coating.

In any of the above alternatives, coating and impregnation may be followed by a drying step before assembly of the decorative sheet into a laminate with the substrate. The substrate may be of conventional type comprising a plurality of kraft paper sheets impregnated or coated with a laminating resin such as a phenol formaldehyde resin.

The pigmented or printed decorative sheet, either with or without particulate abrasive incorporated therein, is within a conventional weight range of about 55 to 200 grams per square meter and preferably from about 80 to 150 grams per square meter. The mixture of thermosetting resin, hydrolyzed polyvinyl alcohol and fumed amorphous silica is applied in an amount sufficient to provide a resin content of about 38% to 65%, preferably about 45% to 58%, by weight based on the final dry weight of the paper on a resin solids basis.

When using a decorative sheet having a surface layer incorporating particulate abrasive, such as alumina, the particle size and amount will be so selected as to fall within the ranges set forth above, viz. an average particle size of 5 to 30 and preferably 15 to 25 microns, in an amount constituting from 2 to 10 and preferably about 4 to 6 grams per square meter of surface area. Commercially available grades of this type are sold by Mead Corporation under the registered trademark Duoply. One type, designated as Duoply 5%, is a pigmented paper having a weight of 65 pounds per 3000 square foot ream or 106 grams per square meter, an alumina particle size of 5 microns on one surface only, in an amount of 5.3 grams per square meter of surface area. Another grade designated as Duoply 8% differs only in the amount of alumina, which is 8.5 grams per square meter of surface area.

In the method of the invention, the coated and impregnated decorative sheet is dried at a temperature of about 140° to 170° C. for about a minute. This sheet is then stacked as the uppermost lamella of about 2 to 8 core sheets of 6–20 mil kraft paper impregnated with a phenolic resin having a resin solids content of about 20% to about 40% of the total weight of the core. These core sheets also are oven dried after impregnation for about a minute at about 140° to 170° C., prior to assembly. The stacked sheets are then placed between stainless steel plates upon which a pressure of from about 500 to 1600 psi (3.5 to 11.3 MPa) is exerted, at temperatures of about 120° to 180° C. for about 20 minutes, in order to effect curing and to provide the high pressure laminate. In a preferred practice, a textured sheet or film is interposed between the steel plate and the decorative sheet in order to impart a desired surface finish which may be a matte finish or an embossed effect.

Series of tests have been conducted comparing the laminate of the present invention with laminates omitting one or more of the essential ingredients hydrolyzed polyvinyl alcohol, fumed amorphous silica, or particulate abrasive material. Abrasion resistance, mar resistance, crock resistance, stain resistance and dust rating tests were conducted, and the test data are summarized in Tables I through IV below. The decorative sheets of the invention tested in these tables were prepared using the modified melamine formaldehyde formulation set forth above, which was mixed with additional ingredients to provide an aqueous dispersion having the following formulation:

| | Parts by Weight |
|---|---|
| Modified melamine formaldehyde resin (49% non-volatile solids) | 68.45 |
| Polyvinyl alcohol (Vinol 107) (14% concentration in water) | 12.50 |
| Melamine formaldehyde resin (Cymel 412) (solid) | 14.78 |
| Fumed amorphous silica (Cab-O-Sil M5 or Aerosil) | 2.11 |
| Calcined alumina (WCA 25) (25 micron mean particle size) | 2.11 |
| Surfactant (Surfonic LF-17) | 0.05 |
| | 100.00 |
| Yield of solid resin | 55.00 |

Application to decorative sheets was effected in an amount sufficient to obtain a resin solids content of about 52% based on the dry weight of the decorative paper.

Table I contains data on samples not in accordance with the invention since no fumed amorphous silica was present therein. It is apparent from Sample 2 that hydrolyzed polyvinyl alcohol alone does not prevent dusting. It is also evident that the abrasive material which was present on the surface of the Duoply paper in Sample 3 was more effective in increasing the initial point abrasion resistance than a slightly smaller amount of abrasive material dispersed in the resin.

Referring to Table II, Sample 4, a sample in accordance with the invention, produced excellent abrasion resistance, mar resistance and dust rating. Sample 3, which omitted fumed amorphous silica, exhibited an unacceptable dust rating. Stain resistance and crocking resistance were acceptable for Sample 4. Sample 5, which omitted polyvinyl alcohol, although high in abrasion and mar resistance, exhibited an unacceptable dust rating.

Sample 6, which contained no abrasive material, exhibited unacceptable abrasion resistance.

Table III indicates that addition of hydrolyzed polyvinyl alcohol and fumed amorphous silica enhanced abrasion resistance both for 9 micron (Sample 7) and 25 micron (Sample 8) particle size abrasive, in comparison to Samples 10 and 11, even though Sample 7 did not achieve adequate abrasion resistance.

Table IV shows that the addition of surfactant in Sample 13 produced significant improvement in abrasion resistance, mar resistance, dust rating and crock resistance, in comparison to sample 12.

It is apparent that the objective of the invention is achieved when the essential ingredients are present and that omission of any one or more of the essential ingredients results in loss of one or more of the important properties.

TABLE I

| Sample | Paper | PVA Amount g/m$^2$ | Abrasive Amount g/m$^2$ | Abrasion Resistance (NEMA WEAR) cycles | Mar Resistance % gloss loss | Crock Resistance | Dust Rating | Stain Resistance |
|---|---|---|---|---|---|---|---|---|
| 1 | Standard | 0 | 0 | 770 | 15 | 3 | 17 | N.E. |
| 2 | Standard | 4.1 | 4.3 | 1193 | 0 | 4 | 110 | N.E. |
| 3 | Duoply 5% (1) | 4.1 | 5.3 | 3758 | 0 | 4 | 83 | N.E. |

(1) Alumina of 25 micron particle size on surface, obtained from Mead Corporation.
N.E. = No effect

TABLE II

| Sample | Paper | PVA Amount g/m$^2$ | Fumed Amorphous silica amount g/m$^2$ | Abrasive Amount g/m$^2$ | Abrasion Resistance NEMA Wear cycles | Crock Resistance | Mar Resistance % gloss loss | Dust Rating | Stain Resistance |
|---|---|---|---|---|---|---|---|---|---|
| 3 | Duoply 5% | 4.1 | 0 | 5.3 | 3758 | 4 | 0 | 83 | N.E. |
| 4* | Duoply 5% | 4.1 | 5.2 | 5.3 | 5204 | 4 | −5 | 16 | N.E. |
| 5 | Duoply 5% | 0 | 5.2 | 5.3 | 3999 | 4 | 0 | 97 | N.E. |
| 6 | Standard | 4.1 | 5.2 | 0 | 1193 | 4 | 0 | 110 | N.E. |

*Present invention
N.E. = No effect

TABLE III

| Sample | Paper | PVA Amount g/m$^2$ | Fumed Amorphous silica amount g/m$^2$ | Abrasive Amount g/m$^2$ | Abrasion Resistance NEMA Wear cycles | Crock Resistance | Mar Resistance % gloss loss | Dust Rating | Stain Resistance |
|---|---|---|---|---|---|---|---|---|---|
| 7 | Standard | 3.9 | 5.0 | 5.0 (1) | 1573 | 5 | 6 | 3 | — |
| 8* | Standard | 4.0 | 5.1 | 5.2 (2) | 3320 | 4–5 | 4 | 20 | N.E. |
| 9 | Standard | 0 | 0 | 0 | 646 | 1–2 | 41 | 7 | N.E. |
| 10 | Standard | 0 | 0 | 4.6(1) | 833 | 1–2 | 8 | 8 | N.E. |
| 11 | Duoply 5% | 0 | 0 | 5.3(2) | 2149 | 3–4 | −3 | — | — |

(1) Mean particle size 9 microns
(2) Mean particle size 25 microns
*Present invention
N.E. No effect

TABLE IV

| Sample | Paper | PVA Amount g/m$^2$ | Fumed Amorphous silica amount g/m$^2$ | Abrasive Amount g/m$^2$ | Abrasion Resistance NEMA Wear cycles | Crock Resistance | Mar Resistance % gloss loss | Dust Rating | Stain Resistance |
|---|---|---|---|---|---|---|---|---|---|
| 12 | Standard | 4.1 | 5.2 | 5.2 (1) | 1977 | 4 | 6 | 13 | N.E. |
| 13* | Standard | 4.1 | 5.2 | 5.2 (1) | 3655 | 5 | 2 | 7 | N.E. |

(1) Mean particle size 9 microns
*Present invention
N.E. No effect
Sample 12 contained no surfactant
Sample 13 contained 0.11 g/m$^2$ nonionic surfactant

We claim:

1. A decorative laminate having improved resistance against marring, abrasion, staining, dusting and crocking, said laminate comprising a substrate and a decorative sheet in superposed relation, said decorative sheet having at least on the exposed surface thereof a layer consisting essentially of a thermoset resin chosen from the group consisting of melamine formaldehyde, modified melamine formaldehyde, and polyester, substantially fully hydrolyzed polyvinyl alcohol, fumed amorphous silica, and particulate abrasive material having a hardness higher than that of silica, the proportions of said thermoset resin, polyvinyl alcohol, fumed amorphous silica and particulate abrasive being such that said exposed surface exhibits mar resistance of less than 4% gloss change by the herein described test, and abrasion resistance greater than 3,000 cycles (NEMA Wear) by the NEMA test LD 3-3.01.

2. A decorative laminate having improved resistance against marring, abrasion, staining, dusting and crocking, said laminate comprising a substrate and a decorative sheet in superposed relation, said decorative sheet being coated with a mixture consisting essentially of a thermoset resin chosen from the group consisting of melamine formaldehyde, modified melamine formaldehyde, and polyester, substantially fully hydrolyzed polyvinyl alcohol, fumed amorphous silica, and particulate abrasive material having a hardness higher than that of silica, said thermoset resin ranging from about 38% to 63% by weight based on the final dry weight of said decorative sheet, said polyvinyl alcohol ranging from about 0.2 to 10 grams per square meter of surface area, said fumed amorphous silica ranging from about 0.2 to 10 grams per square meter of surface area, and said particulate abrasive ranging from about 0.2 to 10 grams per square meter of surface area.

3. The laminate claimed in claim 1 or 2, wherein said thermoset resin is melamine formaldehyde having a formaldehyde to melamine molar ratio ranging from 1.0 to 3.0.

4. The laminate claimed in claim 1 or 2, wherein said polyvinyl alcohol has a degree of hydrolysis ranging from about 87% to 99.6% of the acetate groups therein.

5. The laminate claimed in claim 1 or 2, wherein said fumed amorphous silica ranges from about 0.007 to about 0.05 micron in particle size.

6. The laminate claimed in claim 1 or 2, wherein said particulate abrasive is at least one of alumina, titanium oxide, tin oxide, zirconium oxide, diamond, alumina coated on silica, and zirconia coated on silica, and has a mean particle size ranging from about 15 to 25 microns.

7. The laminate claimed in claim 2, wherein said mixture includes a nonionic or cationic surfactant in an amount ranging from about 0.01 to 0.20 gram per square meter of surface area.

8. The laminate claimed in claim 1 or 2, wherein said thermoset resin is melamine formaldehyde having a formaldehyde to melamine molratio ranging from 1.0 to 3.0, wherein said polyvinyl alcohol has a degree of hydrolysis ranging from about 87% to 99.6% of the acetate groups therein, wherein said fumed amorphous silica ranges from about 0.007 to about 0.05 micron in particle size, wherein said particulate abrasive is at least one of alumina, titanium oxide, tin oxide, zirconium oxide, diamond, alumina coated on silica, and zirconia coated on silica, and has a mean particle size ranging from about 5 to 30 microns, and including a nonionic surfactant in an amount ranging from about 0.01 to 0.20 gram per square meter of surface area.

9. The laminate claimed in claim 8, wherein said thermoset resin ranges from about 45% to 58% by weight based on the final dry weight of said decorative sheet and has a melamine to formaldehyde molar ratio ranging from 1.15 to 2.40, said polyvinyl alcohol ranges from about 3 to 5 grams per square meter of surface area, said fumed amorphous silica ranges from about 4 to 6 grams per square meter of surface area, said particulate abrasive ranges from about 4 to 6 grams per square meter of surface area, and said nonionic surfactant ranges from about 0.02 to 0.10 gram per square meter of surface area.

10. The laminate claimed in claim 1 or 2, wherein the refractive index and clarity of said particulate abrasive material closely approximate that of said cured thermoset resin.

11. The laminate claimed in claim 10, wherein said particulate abrasive is calcined alumina and said resin is melamine formaldehyde.

12. A method for the preparation of a mar-resistant and abrasion-resistant decorative laminate, comprising the steps of forming a component sheet having on the surface thereof a composition consisting essentially of a thermosetting resin chosen from the group consisting of melamine formaldehyde, modified melamine formaldehyde, and polyester, substantially fully hydrolyzed polyvinyl alcohol, fumed amorphous silica, and particulate abrasive material having a hardness higher than that of silica; assembling said component sheet with a substrate; and subjecting the assembled component sheet and substrate to heat and pressure sufficient to consolidate said component sheet and substrate, to cure said resin to a thermoset condition, and to form an exposed surface exhibiting mar resistance of less than 4% gloss change by the herein described test, and abrasion resistance greater than 3000 cycles (NEMA Wear) by the NEMA test LD 3-3.01.

13. A method for the preparation of a mar-resistant decorative laminate, comprising the steps of incorporating in an aqueous dispersion a thermosetting resin in an amount such that the solid components of the resin range from about 40% to 60% of the weight of liquid resin, said resin being one of melamine formaldehyde, modified melamine formaldehyde, and polyester, substantially fully hydrolyzed polyvinyl alcohol in an amount ranging from about 1.5% to 5.0% by weight, fumed amorphous silica in an amount ranging from about 2% to 4% by weight, and particulate abrasive material in an amount ranging from about 1.5 to 6.0% by weight, said particulate abrasive material having a hardness higher than that of silica; coating a component sheet with said dispersion in an amount such that the solid components of said dispersion are from 38% to 65% by weight of the final dried component sheet; assembling said coated component sheet with a substrate; and subjecting the assembled component sheet and substrate to heat and pressure sufficient to consolidate said component sheet and said substrate, to cure said resin to a thermoset condition, and to form an exposed surface exhibiting improved mar resistance, abrasion resistance, stain resistance, dusting resistance and crocking resistance.

14. The method of claim 12 or 13, including the step of drying said component sheet prior to assembling it with said substrate.

15. The method claimed in claim 12 or 13, wherein said thermosetting resin is melamine formaldehyde having a formaldehyde to melamine molar ratio ranging from 1.0 to 3.0.

16. The method claimed in claim 12 or 13, wherein said polyvinyl alcohol has a degree of hydrolysis ranging from about 87% to 99.6% of the acetate groups therein.

17. The method claimed in claim 12 or 13, wherein said fumed amorphous silica ranges from about 0.007 to about 0.05 micron in particle size.

18. The method claimed in claim 12 or 13, wherein said particulate abrasive is at least one of alumina, titanium oxide, tin oxide, zirconium oxide, diamond, alumina coated on silica, and zirconia coated on silica, and has a mean particle size ranging from about 15 to 25 microns.

19. The method claimed in claim 12 or 13, wherein said dispersion includes a nonionic or cationic surfactant in an amount ranging from about 0.01 to 0.20 gram per square meter of surface area.

20. The method claimed in claim 12 or 13, wherein said thermoset resin is melamine formaldehyde having a formaldehyde to melamine molar ratio ranging from 1.0 to 3.0, wherein said polyvinyl alcohol has a degree of hydrolysis ranging from about 87% to 99.6% of the acetate groups therein, wherein said fumed amorphous silica ranges from about 0.007 to about 0.05 micron in particle size, wherein said particulate abrasive is at least one of alumina, titanium oxide, tin oxide, zirconium oxide, diamond, alumina coated on silica, and zirconia coated on silica, and has a mean particle size ranging from about 5 to 30 microns, and including a nonionic surfactant in an amount ranging from about 0.01 to 0.20 gram per square meter of surface area.

21. The method claimed in claim 12 or 13, wherein the refractive index and clarity of said particulate abrasive material closely approximate that of said thermosetting resin when cured.

22. The method claimed in claim 21, wherein said particulate abrasive is calcined alumina and said resin is melamine formaldehyde.

23. The method claimed in claim 12, wherein said particulate abrasive material is initially provided on one surface of said component sheet as part of the composition of said sheet and is incorporated with said thermosetting resin, polyvinyl alcohol and fumed amorphous silica.

* * * * *